United States Patent [19]

Jones

[11] Patent Number: 5,095,992

[45] Date of Patent: Mar. 17, 1992

[54] PROCESS FOR INSTALLING CASING IN A BOREHOLE

[75] Inventor: Tom Jones, Hilo, Hi.

[73] Assignee: Parco Mast and Substructures, Inc., Del City, Okla.

[21] Appl. No.: 674,550

[22] Filed: Mar. 22, 1991

[51] Int. Cl.⁵ .................. E21B 33/14; E21B 41/00
[52] U.S. Cl. .................. 166/380; 166/292; 166/382
[58] Field of Search ............... 166/285, 292, 291, 286, 166/382, 206, 380

[56] References Cited

U.S. PATENT DOCUMENTS

| | | | |
|---|---|---|---|
| 2,228,555 | 1/1941 | Barker | 166/382 X |
| 2,279,262 | 4/1942 | Edwards | 166/292 |
| 3,499,491 | 3/1970 | Wyant et al. | 166/292 |
| 3,811,500 | 5/1974 | Morrisett et al. | 166/154 |
| 4,190,111 | 3/1980 | Davis | 166/291 |
| 4,289,023 | 9/1981 | Rader | 73/151 |
| 4,653,587 | 3/1987 | Bodine | 166/285 |
| 4,655,286 | 4/1987 | Wood | 166/285 |
| 4,674,573 | 6/1987 | Bode | 166/291 |
| 4,691,772 | 9/1987 | Ebenhack et al. | 166/254 |
| 4,716,965 | 1/1988 | Bol et al. | 166/292 |
| 4,736,794 | 8/1988 | Bodine | 166/286 |
| 4,782,894 | 11/1988 | LaFleur | 166/275 |
| 4,793,409 | 12/1988 | Bridges et al. | 166/57 |
| 4,844,164 | 7/1989 | Shen | 166/291 |
| 4,856,592 | 8/1989 | Van Bilderbeek | 166/285 |
| 4,883,125 | 11/1989 | Wilson et al. | 166/291 |
| 5,029,645 | 7/1991 | Allen | 166/286 |

OTHER PUBLICATIONS

Zaba & Doherty, "Practical Petroleum Engineers' Handbook", 3rd Ed., 1951, Houston, TX, p. 27.

*Primary Examiner*—Stephen J. Novosad
*Attorney, Agent, or Firm*—Head & Johnson

[57] ABSTRACT

The process for installing casing in a well including the steps of suspending a string of casing in a well leaving an annular area exterior of the casing, depositing barite into the annular area, and permitting the barite to settle and pack in the annular area to thereby anchor the casing.

5 Claims, 1 Drawing Sheet

PROCESS FOR INSTALLING CASING IN A BOREHOLE

BACKGROUND OF THE INVENTION

The general procedure for drilling an oil or gas well includes setting a relatively short string of casing, normally referred to as a "conductor pipe," in a borehole soon after the start of an operation. The annulus between the outside of the conductor pipe and the inside of the borehole is typically filled with a mixture of portland cement and water. A slightly smaller hole is then drilled below the conductor pipe and another string of casing, typically referred to as the "surface casing," is run and set. Surface casing may be set as shallow as 500 feet or as deep as 6,000 feet.

The next string of casing set in the borehole is usually referred to as an "intermediate string" or a "protection string" if it is a deep hole. The next string might be used to case a hole to its total depth, in which case the string would be referred to as the "production string." This disclosure relates primarily to setting the surface casing.

The principle objective in cementing surface casing is to secure the casing in the borehole so that the vibration and hammering of the whipping drill pipe will not damage the casing. If surface casing is not properly set, the bottom joints of the casing may break free and drop, obstructing further drilling. Another reason for properly setting the surface casing is to seal off communication of the borehole with upper water sands, preventing the loss of heavier drilling fluids that might be required for drilling the deeper portion of a hole. Basically, the purpose for properly setting the surface casing is to secure the casing and to prevent communication between water, oil and gas producing zones and other porous zones.

An objective of this disclosure is to provide an improved process for grouting surface casing in an oil or gas well borehole.

SUMMARY OF THE INVENTION

The present disclosure provides an improved means of anchoring surface casing in a well borehole in the process of drilling an oil or gas well. After the initial borehole is drilled a large diameter conductor pipe is set. Subsequently, a borehole of less diameter is drilled to a selected depth, usually between 500 and 6,000 feet, and a surface casing is set within the conductor pipe. Surface casing may be, as an example, of 9⅝ inch diameter. The surface casing must be securely set so as to effectively seal an oil and gas production strata from water bearing formations, typically found closer to the earth's surface, or other porous formations that could permit the escape of oil or gas from the lower strata.

In the most direct process of practicing the invention, a slurry of barite and water is formed as a grout and deposited directly in an annular area exterior of the surface casing. A barite and water slurry is relatively easily formed and pumped. Barite has the characteristics of setting from water, being insoluble in water, and when settled from water, securely packs into a solid mass.

In another process particularly applicable where a water bearing strata or void area is encountered in the early stages of drilling a borehole, a cement slurry is first conducted into the annular area surrounding the surface casing. The cement slurry may be deposited to a level to that adjacent to the lower edge of the water bearing or void formation. Thereafter barite, or barite and water is deposited into the annular area to fill it to the earth's surface.

A barite and water grout can be mixed having a weight of up to 24 lbs per gallon. Such a high weight per volume combined with the propensity of barite to settle and pack from a water slurry produces a highly effective and efficient means of anchoring surface casing in an oil or gas well.

In some instances it is desirable that a packer be set exterior of the surface casing to close the lower portion of the annular area between the exterior of the surfacing casing and the conductor pipe. The type of packer employed may be referred to as a "packer shoe" or "duplex shoe and packer." When a packer is set it forms the lower boundary of the grout serving to anchor the surface casing.

A grout in the form of barite or in the form of barite and water may be provided in a variety of ways. In one method a silo can be filled with dry powdered barite. The powdered barite is conveyed to a blender and moved by air into the annular area exterior of the surface casing.

In another process barite and water are mixed as a slurry in a large tank at a selected ratio, such as about 18 lbs of barite per gallon of water to form a grout. A pump is then used to move the grout from the tank into the annular area surrounding a surface casing.

For background material relating to other methods of securing surface casing in an oil or gas well reference may be had to the following previously issued U.S. Pat. Nos. 3,499,491; 3,811,500; 4,190,111; 4,289,023; 4,653,587; 4,655,286; 4,674,573; 4,736,794; 4,716,965; 4,691,772; 4,782,894; 4,844,164; 4,856,592 and 4,883,125.

DESCRIPTION OF THE PREFERRED EMBODIMENTS

Figure 1:
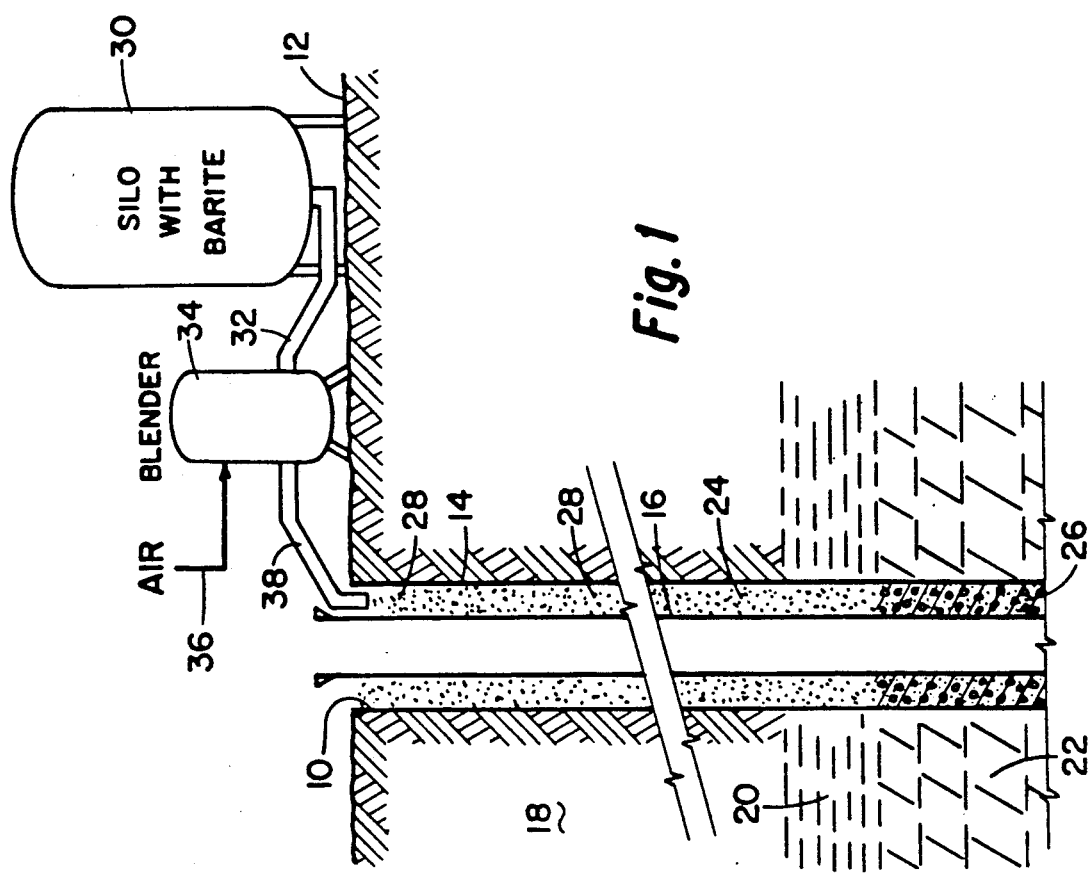
FIG. 1 is a diagrammatic cross-sectional view of the earth showing the earth's surface and a borehole therein and showing a surface casing positioned in a conductor pipe and illustrating one system for depositing barite into the annular area surrounding the surface casing to grout the surface casing into position in the borehole.

Referring to the drawings and first to FIG. 1, one method of practicing the system of this invention is illustrated. A borehole 10 has been formed in the earth, the borehole extending from the earth's surface 12 a substantial distance into the earth. A drilling rig is normally on location during the practice of this invention but is not shown.

Positioned in borehole 10 is a large diameter pipe 14 that is frequently referred to as a conductor pipe. The purpose of the conductor pipe is to close off the borehole in the area adjacent the surface to keep it from caving in and to provide an annular area in which the borehole can be continued to greater depths.

Positioned within conductor pipe 14 is a string of surface casing 16. By way of example, conductor pipe 14 may be such as twenty inches in diameter, while the surface casing 16 is typically 9⅝ inches in diameter. The process of this invention is a means of securing surface casing 16 within borehole 10 and within conductor pipe 14.

Surface casing 16 may extend to depths such as from several hundred feet to several thousand feet, depending upon the ultimate depth of the borehole and the characteristics of the formations in which the borehole is drilled. Securely anchoring surface casing 16 in borehole 10 is extremely important for, among other things, protection of the upper strata in which the borehole is drilled against the migration of fluids and gases from subterranean formations.

FIG. 1 shows borehole 10 extending through a strata of earth, indicated by the numeral 18 and that may be termed a "surface strata," and through a water bearing strata 20 and a subterranean strata 22. Instead of a water bearing strata 20, in some instances, void areas are encountered when drilling a borehole.

Surrounding the exterior of surface casing 16 and within conductor pipe 14, or within the borehole if the surface casing extends below the lower end of the conductor pipe 14, is an annular area 24. The purpose of the process of this invention is to provide means of anchoring casing 16 and for sealing annular area 24 to prevent flow of fluid or gases therethrough and to secure surface casing 16. For this purpose, grout material is deposited into annular area 24. Typical grouting material employed in the drilling industry is a cement slurry. FIG. 1 shows a cement slurry 26 deposited within annular area 24 up to the level of the top of the subterranean strata 22.

According to the principles of this invention, instead of, as is the usual case, completely filling annular area 24 to the earth's surface 22 with cement slurry 26, annular area 24 is filled with a barite, barite being indicated by the numeral 28.

Barite is a naturally occurring mineral characterized by its fairly heavy specific gravity; its substantial insolubility; its ability to mix with water to form a pumpable slurry; and the characteristic of settling from water to form a compact solid when a slurry is left in a state wherein mixing is not substantially continuous.

The method of providing barite 28, as illustrated in FIG. 1, includes a storage vessel or silo 30 having powdered barite therein. By means of conduit 32 the powdered barite is conveyed to a blender 34. Air from conduit 36 is fed into the blender and barite is passed out through discharge conduit 38 and into annular area 24.

Barite 28 passing into annular area 24 settles to the bottom of the annular area. The barite packs around surface casing 16. When water exists in the annular area, such as from a water producing formation 20, a slurry of barite and water is formed. The barite readily settles out of the slurry to pack within the annular area 24 and to thereby anchor casing 16 in place.

Figure 2:
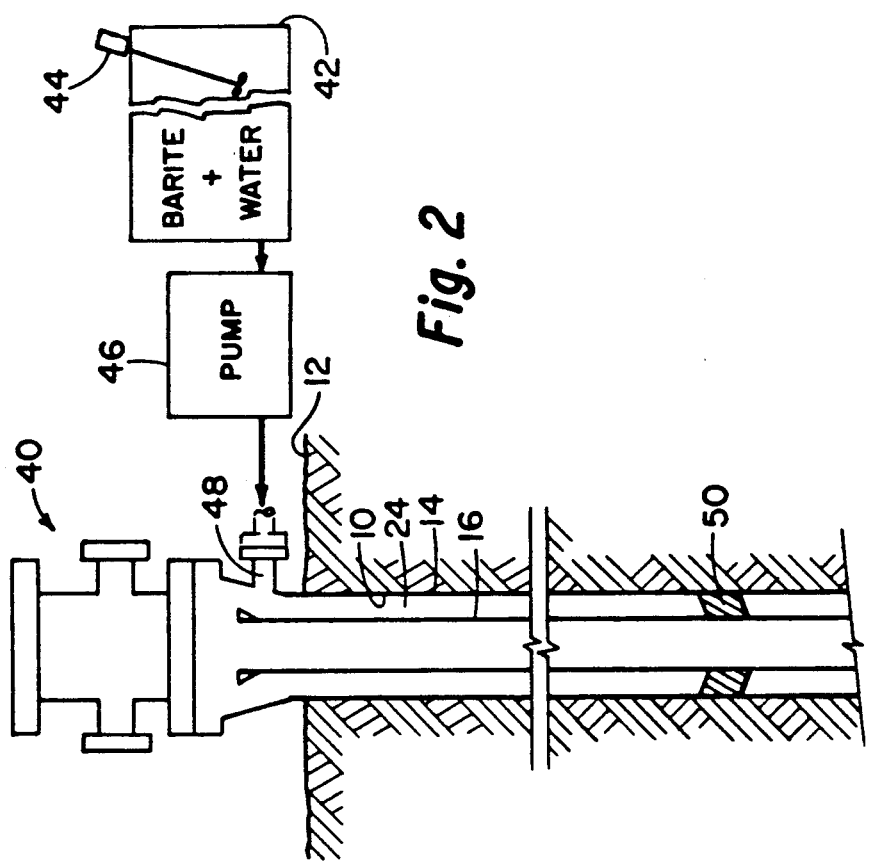
FIG. 2 is a diagrammatic elevational view showing a borehole in the earth's surface with a conductor pipe therein and well head apparatus secured to the conductor pipe above the earth's surface with a surface casing positioned within the conductor pipe and showing another system for conveying a barite water mixture by means of a pump into the annular area to securely anchor and seal the surface casing in the borehole.

An alternate arrangement for practicing the process of this invention is shown in FIG. 2 which shows borehole 10, earth's surface 12, conductor pipe 14, and surface casing 16 all as previously described. FIG. 2 shows wellhead equipment, generally indicated by the numeral 40, affixed to the top of conductor pipe 14.

To fill the annular area 24 with a barite water slurry, a tank 42 is provided in which barite and water are mixed to form a slurry. The mixture must be continuously stirred or circulated, such as by use of a mixing device 44, to prevent the barite from settling out. Mixing device 44 maintains a pumpable barite and water slurry within tank 42.

By means of a pump 46 the slurry from tank 42 is delivered through a conduit 48, forming a part of the wellhead equipment 40, directly into annular area 42. When the slurry is delivered into the annular area it will settle and fill the annular area in the way previously described.

Water weighs about 8.33 lbs per gallon. It is possible to form a pumpable slurry with barite having a weight of about 24 lbs per gallon, that is, a slurry having an exceedingly heavy weight. The slurry deposited in annular area 24 settles and completely fills the annular area surrounding surface casing 16. Immediately upon deposit of slurry 28, the barite begins to settle from the water. As it settles it packs securely around casing 16, grouting action is achieved without chemical reaction, as takes place with cement. The barite slurry is applied until the solidified barite approaches the earth's surface 12.

In some instances, and particularly when it is desirable to reduce the total amount of material needed to securely anchor surface casing 16, it is not necessary that the anchoring material extend completely to the bottom of surface casing 16. It may be desirable to provide a packer 50 on the exterior of surface casing 16. Packer 50 may be also referred to as a "duplex shoe" and serves to close the lower end of annular area 24. The barite slurry forming the grout to anchor the surface casing thereby extends from packer 50 up to adjacent the earth's surface 12.

One of the advantages of using a barite slurry compared to cement is that the barite slurry does not set up with time, that is, the slurry can be maintained indefinitely as long as it is stirred or circulated, whereas cement has a relatively short time life after it is mixed with water before it sets up.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A process for installing casing in a well, comprising:
    suspending a string of casing in a well leaving an annular area exterior of the casing;
    depositing barite into the annular area;
    permitting the barite to settle and pack in the annular area to thereby anchor said casing.

2. A process according to claim 1 wherein said barite is deposited as a slurry formed by barite and water mixed at a ratio producing a slurry weighing 24 pounds or less per gallon.

3. A process according to claim 1 wherein the step of depositing barite into the annular area including the step of:
discharging powdered barite and air into a blender;
mixing the barite and air in the blender and discharging the mixture into the annular area.

4. A process according to claim 1 including the step of mixing powdered barite and water in a vessel to form a slurry; and
pumping the slurry from the vessel into an annular area.

5. A process for installing casing in a well, comprising:
suspending a string of casing in a well leaving an annular area exterior of the casing;
pumping cement slurry into the annular area to cause the cement slurry to settle in the lower portion of the annular area;
depositing barite into the annular area to substantially fill the annular area to the earth's surface; and
permitting said cement slurry to solidify and said barite to settle to pack said annular area to anchor and casing.

* * * * *